United States Patent [19]
von Allwörden et al.

[11] Patent Number: 5,428,945
[45] Date of Patent: Jul. 4, 1995

[54] CLEANING DEVICE FOR HARVESTER-THRESHER

[75] Inventors: Wilhelm von Allwörden, Oberstotzingen; Josel Hönl, Lauingen; Rainer Gansel, Ditzingen; Hans W. Roth, Tam; Karl Schips, Urbach; Rolf Fichter, Fellbach, all of Germany

[73] Assignee: Klockner-Humboldt-Deutz AG, Koln-Porz, Germany

[21] Appl. No.: 90,214

[22] PCT Filed: Nov. 19, 1992

[86] PCT No.: PCT/EP92/02660
§ 371 Date: Nov. 23, 1993
§ 102(e) Date: Nov. 23, 1993

[87] PCT Pub. No.: WO93/09662
PCT Pub. Date: May 27, 1993

[30] Foreign Application Priority Data
Nov. 23, 1991 [DE] Germany .............. 41 38 530.6

[51] Int. Cl.⁶ .............. A01D 45/00; A01F 12/00
[52] U.S. Cl. .............. 56/12.8; 460/98
[58] Field of Search .............. 56/12.8; 460/97–100

[56] References Cited

U.S. PATENT DOCUMENTS 4,208,858 6/1980 Rowland-Hill .............. 460/98 X
4,465,081 8/1984 Decoene et al. .............. 460/98
4,475,561 10/1984 Decoene et al. .............. 460/100 X

*Primary Examiner*—Michael Powell Buiz
*Attorney, Agent, or Firm*—Charles L. Schwab; Hardaway Law Firm

[57] ABSTRACT

The cleaning device for a harvester thresher includes a cross-flow fan supplying air to the cleaning sieve section and air guiding structure in the discharge flow from the fan to effect desired air distribution.

13 Claims, 3 Drawing Sheets

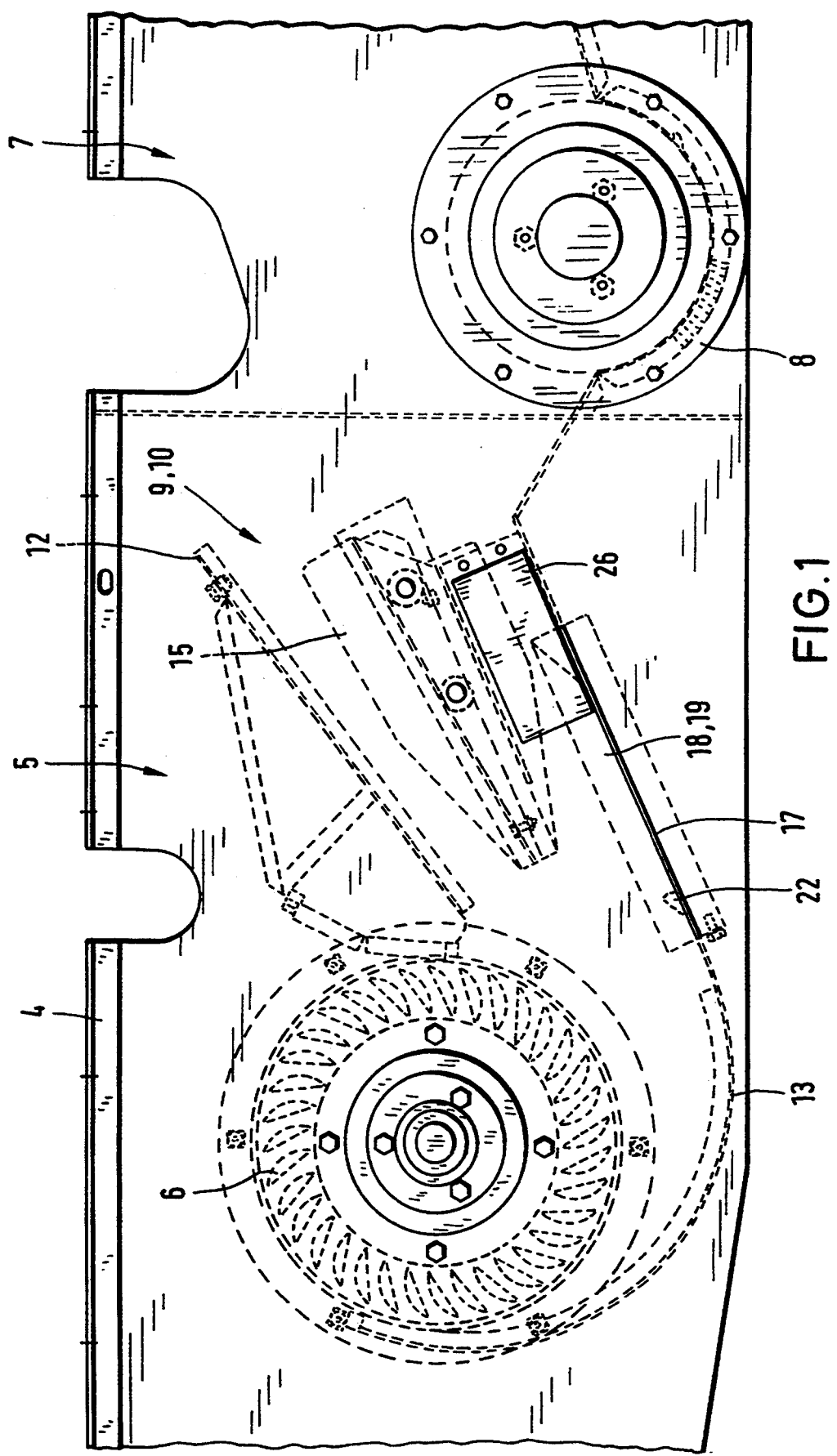

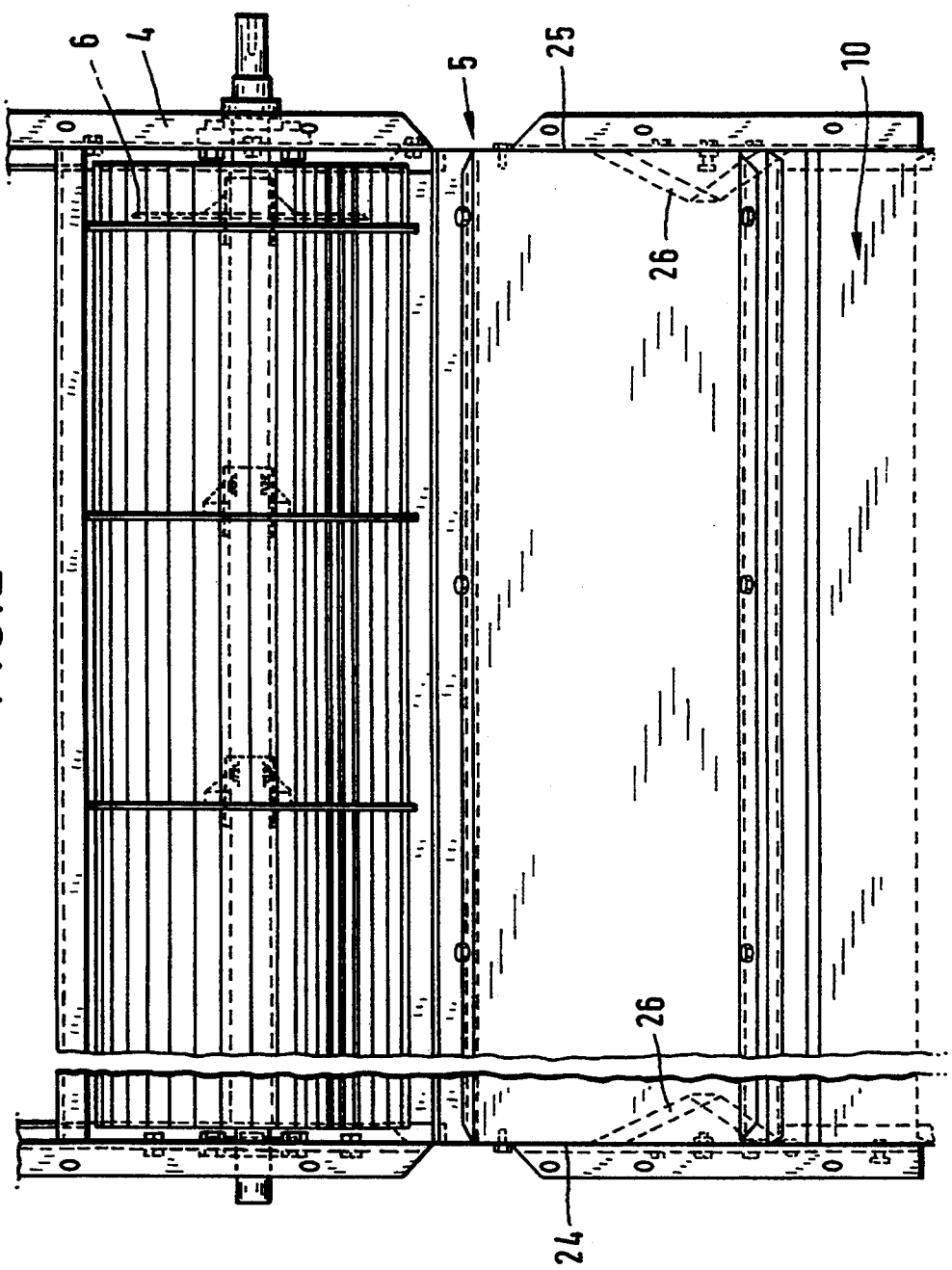

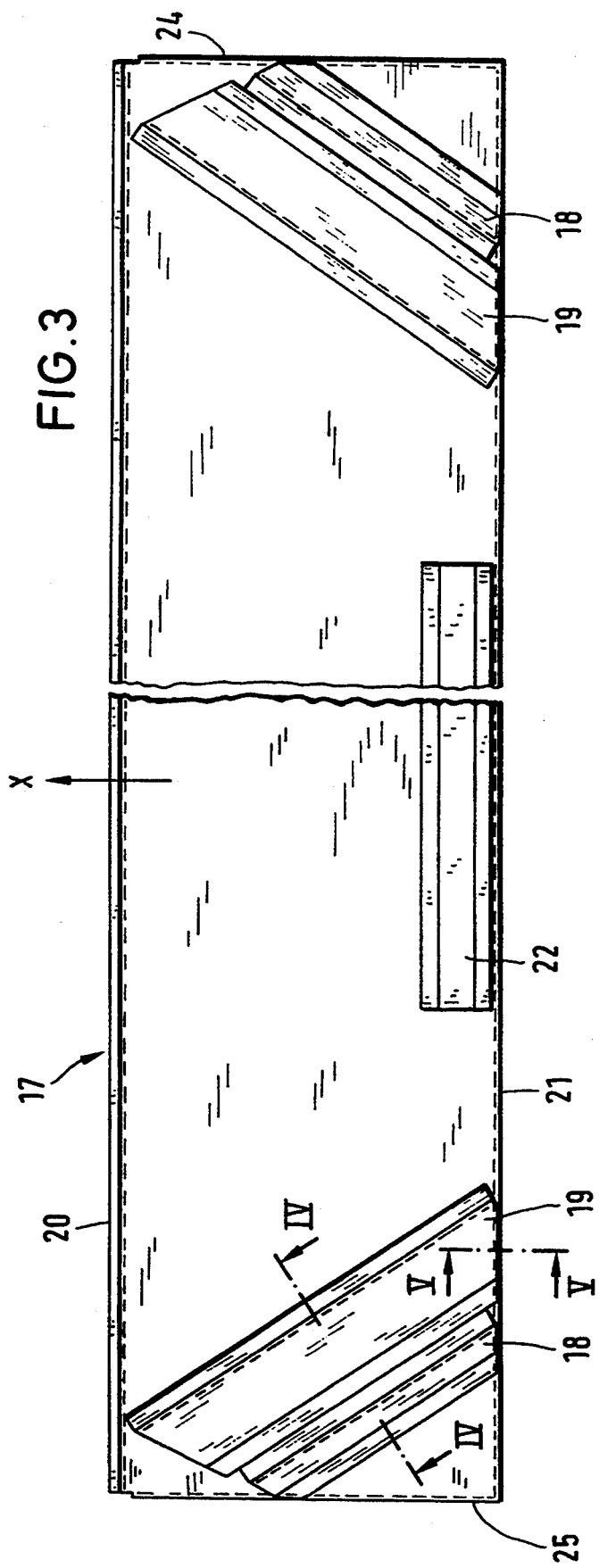
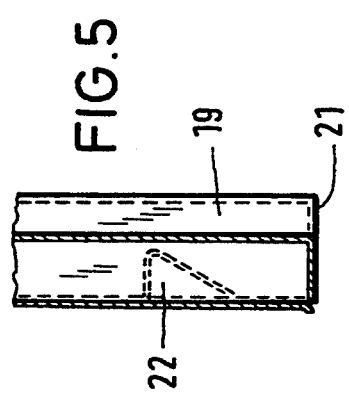
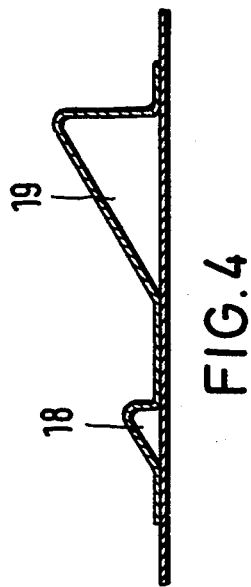

CLEANING DEVICE FOR HARVESTER-THRESHER

TECHNICAL FIELD

This invention relates to a cleaning device for harvester-threshers and more particularly to means for guiding air flow produced by a radial-flow fan.

BACKGROUND OF THE INVENTION

The structure of known cleaning devices for the grain in harvester-threshers provides a fan, to which an air guiding device is connected on the discharge side, by which means the air stream generated by the fan can be purposely guided to the sifting arrangement.

The use of a cross-flow fan for the cleaning device of a harvester-thresher is shown in German patent document EP-OS 0 385 107. The cross-flow fan consists of a broad, drum-shaped rotor of radial structural form having numerous forward-curved vanes on the housing shell. The suction flow as well as the discharge flow of the fan are transverse to the axial direction of the fan housing. The cross-flow fan used in the harvester-thresher extends over the entire width of the sifting arrangement.

This design of fan has the disadvantageous property that contaminants or grains entering the housing of the cross-flow fan are not automatically discharged. In this way, there is a functional influence due to flow losses, with the consequence that the efficiency of the cleaning device in cross-flow fans installed in harvester-threshers can be detrimentally influenced.

OBJECTS AND SUMMARY OF THE INVENTION

It is an object of the invention to provide measures in the discharge flow region of a cross-flow fan used in the harvester-thresher in order to permit a uniform fan stream independent of the position of the cross-flow fan and further to prevent the entry of foreign bodies into the cross-flow fan.

On the basis of a cleaning device of the type previously explained in more detail, for the achieving of the stated object, the air guiding device of a cleaning device of a harvester-thresher is provided with air guiding profiles, which effect a purposeful separation edge of the air stream in order in this way to prevent penetration of grains or other undesired particles into the air guiding device. The measures in accordance with the invention serve to equalize the blowing profile, referred to the total cross section of the air guiding device, by which means differences in the flow velocity can be reduced to ±2 m/s. The uniform distribution of the air flow has the further advantageous consequence that the downstream sifting device receives a uniform incident flow. The device in accordance with the invention, installed in harvester-threshers having a cross-flow fan, advantageously insures the discharge of grains from the air guiding device, since grains preferentially enter the air guiding device when the harvester-thresher is going down a slope as well as when the harvester-thresher is operated in a tilted position. To this end, the air guiding profiles in accordance with the invention purposely divert the air stream into the zones via which the grain preferentially passes from the cleaning device into the air guiding device.

In a development of the invention, the air guiding profiles are made wedge-shaped, by which means the desired separation edge of the flow can advantageously be strengthened in order to establish a turbulent flow.

A further idea of the invention provides for splitting the air stream by means of an air guiding profile in the air guiding device, which is designed as a diffuser, in order in this way purposely to bring about incident flow against the lower screen and the upper screen of the downstream sifting arrangement. To this end, the air guiding profile, which connects the two side faces of the diffuser, is advantageously arranged in such a fashion that the diffuser is split into two equal cross-sectional areas. The air guiding profile installed in the central zone of the diffuser in coincidence with the installed position of said diffuser exhibits a wedge-shaped cross-sectional profile, the wedge shape extending from the cross-flow fan up to half the length of the air guiding profile, downstream of which there follows a rectangular cross section; that is, the outside faces of the air guiding profile run parallel to one another. On the basis of the oblique installed position, which coincides with that of the diffuser, the bottom side of the air guiding profile in accordance with the invention is shorter than the top side, in order in this way to achieve an equal distance to the downstream sifting arrangement. In this way, an equal distance from the separation edge to the downstream component is advantageously established, which bring about uniform flow conditions.

The design of the diffuser in accordance with the invention further provides for the design of the inner shell as a vortex former, with which the air stream generated by the cross-flow fan can also be purposely influenced in this region. In order to influence the flow on the outer shell of the diffuser lying opposite the inner shell, this region exhibits a plurality of air guiding profiles, which are oriented in the direction of the air guiding profile installed inside the diffuser and splitting the air stream. To this end, the arrangement provides for air guiding profiles arranged in pairs and graduated in height, which profiles are mounted in the region of the side face of the diffuser. In a development of the invention, the air guiding profiles attached to the cover on the outer shell of the diffuser are arranged obliquely outward relative to the air stream direction, in order in this way to guide the air stream into both lateral regions of the diffuser cross section, which has a substantially rectangular cross-sectional shape whose lateral regions would not experience optimal incident flow without the measures in accordance with the invention.

In accordance with the invention, a cover is installed in the diffuser, which cover is attached to the outer shell, pointing into the interior of the diffuser. The cover extends over the full width of the diffuser and serves to support various air guiding profiles.

By means of experiments, it was possible to determine an optimal arrangement of the air guiding profiles on the cover, on which said profiles are arranged obliquely outward, that is, in the direction toward the lateral regions of the air guiding device, at an inclination angle of about 60° to the direction of the air stream.

Further mounted on the cover, on the longitudinal side pointing toward the cross-flow fan, is a further air guiding profile, which is arranged transversely to the air stream direction, said profile extending longitudinally almost up to the pairwise obliquely arranged air guiding profiles.

The air guiding profiles installed at various locations in the diffuser coincide in having a cross-sectional profile that corresponds to a right-angled triangle, each profile being mounted in such a fashion that the hypotenuse is arranged sloping upward in the direction of the air flow. In this way, a desired abrupt flow separation can advantageously be achieved.

As a further measure to prevent grains or foreign bodies passing into the housing of the cross-flow fan, a further air guiding profile or grain diverting profile is mounted on each side face of the diffuser, said profiles oriented toward one another, so as to cover opposingly the end region of the cover as viewed in the direction of the air stream. With this profile becomes advantageously in the case of a use of a harvester-thresher in a tilted position, in which case the grain on the preparation bottom or the sifting arrangement is locally displaced into a marginal zone, with the consequence that a heavy flow of grains passes into the air guiding device locally, which flow is diverted by means of the further profiles in the direction of the central zone of the diffuser for better impingement by means of the air stream. By means of these lateral profiles in accordance with the invention, there is advantageously achieved a distribution of the grain stream over a larger area, so that the air stream picks up and further conveys the grains and prevents a penetration into the fan housing.

In development of the invention, it is further provided that both the installed position and also the cross section of individual air guiding profiles are designed individually or jointly variable for the optimization of the air guiding device for the existing requirements, such as for example frequency of a use of the harvester-thresher in a tilted position, or adapted to the type of grain to be harvested.

BRIEF DESCRIPTION OF THE DRAWINGS

An exemplary embodiment, which contributes to the further explanation of the invention, can be found in the Drawings as well as the description of the Figures that follows.

FIG. 1 shows, in a lateral view, the cleaning device of a harvester-thresher, of which the cross-flow fan and the downstream air guiding device is illustrated.

FIG. 2 shows the top view of the cleaning device illustrated in FIG. 1.

FIG. 3 shows, in an enlarged illustration, the arrangement of a few air guiding profiles in the air guiding device.

FIG. 4 shows, in a detailed illustration, the obliquely installed air guiding profiles.

FIG. 5 shows a further sectional illustration through an obliquely arranged air guiding profile.

DETAILED DESCRIPTION OF THE DRAWINGS

From FIG. 1 the following can be seen: the air guiding device 9 in accordance with the invention, which air guiding device is a component of a cleaning device 5, which further includes a cross-flow fan 6, a cleaning sieve section or sifting arrangement 7 and a conveying auger 8. The cleaning device 5 is installed in a harvester-thresher, of which the frame 4 is illustrated in FIG. 1. The air stream generated by the cross-flow fan 6 impinges on the sifting arrangement 7, said air stream being purposely guided to the sifting arrangement 7 by means of air guiding device 9—designed as diffuser 10—installed between the components cross-flow fan 6 and sifting arrangement 7. The diffuser 10 has a rectangular cross section widening out from cross-flow fan 6, the inner shell 12 and the outer shell 13 of the bounding surfaces of said cross section being illustrated in FIG. 1. The further bounding surfaces, the side faces 24 and 25, can be seen from FIG. 2. The air stream serves to separate the chaff from the grain-chaff mixture delivered by the harvester separation section, not shown, to the sifting arrangement 7, such separation occurring because the chaff and the grain have different specific weight.

The use of the harvester-thresher in a tilted position or when going down a slope has the result that the grain-chaff mixture is not distributed onto the sifting arrangement over a broad zone but in one or a plurality of dense volume flows that cannot be optimally picked up by the air stream. By means of the measures in accordance with the invention, the air stream is purposely guided, with the aid of air guiding profiles, into the zones that can disadvantageously be impinged on by larger volume flows of grain-chaff in dependence on the service conditions. The outer shell 13 has for this purpose a cover 17, to which there are attached an air guiding profile 22 attached transversely to the air stream and obliquely arranged pairs of air guiding profiles 18, 19 in the lateral regions. In the direction of the air stream, partially covering the cover 17 and extending to half the installed position of the cover 17, there is provided a further air guiding profile 26 coinciding with the installed position of the outer shell 13 on both side faces 24, 25 of the diffuser 10, which further air guiding profile, as a diverting profile for a flow of grain undesirably entering the air guiding device 9 from the sifting arrangement 7, also diverts from the side faces 24, 25 into the central zone in order in this way better to be discharged from the diffuser 10.

In FIG. 2 the cleaning device 5, shown in top view relative to FIG. 1, elucidates the mode of operation of air guiding profiles 26 with which the volume stream of chaff-grain disadvantageously passing into a marginal zone, that is, one of the side faces 24, 25, is divertible into the central region of the diffuser 10 in order in this way to be picked up more efficiently by means of the air stream generated by the cross-flow fan 6. By means of this figure it can further be seen that the diffuser extends over the entire width of the cross-flow fan 6 and the lateral bounding surfaces, the side faces 24, 25 of the diffuser 10, coincide with the frame 4.

From FIG. 3 follows the enlarged illustration of the cover 17, which is provided with a plurality of air guiding profiles 18, 19, 22 designed differently from one another. Attached to both outer sides of the cover 17 are air guiding profiles 18, 19 inclined in the direction of the side faces 24, 25, diverging from the air flow direction x, arranged parallel to one another in pairs. As can be seen from the cross-sectional drawing in FIG. 4, both air guiding profiles 18, 19 have a structure comparable to a right-angled triangle, the hypotenuses of which triangles are mounted sloping upward in the direction of the longitudinal side 20 of the cover 17. The air guiding profile 19 connects, in an obliquely running fashion, both longitudinal sides 20, 21; in contrast, the air guiding profile 18, directed further outward, connects the longitudinal side 21 with one of the side faces 24, 25. Attached to the longitudinal side 21 is a further air guiding profile 22 in the central zone of the cover, the longitudinal extent of which further air guiding profile reaches almost to the air guiding profile 19. As can be seen from FIG. 5, the air guiding profile 22 likewise has a cross-sectional shape that corresponds to a right-angled triangle whose hypotenuse is arranged sloping upward from the longitudinal side 21. The design of the cross-sectional profiles 18, 19, 22, as well as that of the air guiding profile 15 arranged centrally in the diffuser 10, by means of their design and arrangement, effect a desired flow separation and thus an advantageously turbulent flow in order in this way to achieve an optimal air stream impingement of the grain-chaff mixture.

What is claimed is:

1. Cleaning device for harvester-threshers, provided with a radial-flow fan producing an air stream of predetermined direction, downstream of which an air guiding device in the form of a diffuser is arranged for incident flow on a sifting arrangement, characterized by the fact that, in various zones of the air guiding device (9), air guiding profiles (15, 18, 19, 22, 26) are provided in various installed positions.

2. Cleaning device in accordance with claim 1, characterized by the fact that the air guiding profiles (15, 18, 19, 22, 26) are designed wedge-shaped.

3. Cleaning device in accordance with claim 1, characterized by the fact that the air guiding device (9) is designed as a diffuser (10), in which the air stream is splittable, by means of an air guiding profile (15) designed as a wedge profile, for a lower and an upper screen of the sifting arrangement (7).

4. Cleaning device in accordance with claim 3, characterized by the fact that an inner shell (12) of the diffuser (10) serves as a vortex former.

5. Cleaning device in accordance with claim 3 foregoing claims, characterized by the fact that a cover (17) for the accommodation of the air guiding profiles (18, 19, 22) is inserted in the diffuser (10) on the side of an outer shell (13) directed toward the interior of the diffuser.

6. Cleaning device in accordance with claim 5, characterized by the fact that the cover (17) extends over the full width of the diffuser (10).

7. Cleaning device in accordance with claim 5 characterized by the fact that both end regions of the cover (17) are provided with air guiding profiles (18, 19) coinciding with one another, arranged in pairs, and graduated in height.

8. Cleaning device in accordance with claim 7, characterized by the fact that the air guiding profiles (18, 19) are arranged obliquely outward relative to the air stream direction, at an angle of about 60°, in the direction of a side face (24, 25) of the diffuser.

9. Cleaning device in accordance with claim 5, characterized by the fact that a the air guiding profile (22) is arranged on the longitudinal side (21) of the cover (17) pointing toward the radial-flow fan (6), transversely to the air stream direction.

10. Cleaning device in accordance with claim 1, characterized by the fact that the incident flow on the air guiding profiles (15, 18, 19, 22, 26) is such that the hypotenuses of the profiles, designed as right-angled in cross section, are each arranged sloping upward in the direction of the air stream direction.

11. Cleaning device in accordance with claim 5 wherein an air guiding profile 26 is attached to each of the side faces (24, 25) of the diffuser near the downstream end of the cover and oriented oppositely to one another.

12. Cleaning device in accordance with claim 11, characterized by the fact that the installed position of the air guiding profile (26) coincides with a grain return flow in the cleaning device (5).

13. Cleaning device in accordance with claim 11, characterized by the fact that the air guiding profiles (15, 18, 19, 22, 26) are designed individually or partially variable in installed position and/or in cross section.

* * * * *

UNITED STATES PATENT AND TRADEMARK OFFICE
CERTIFICATE OF CORRECTION

PATENT NO.   : 5,428,945
DATED        : July 4, 1995
INVENTOR(S)  : Von Allwörden et al It is certified that error appears in the above-indentified patent and that said Letters Patent is hereby corrected as shown below:

Column 5,

Claim 5, line 1, cancel "forego-";

line 2, cancel "ing claims";

Signed and Sealed this

Twenty-sixth Day of September, 1995

Attest:

BRUCE LEHMAN

*Attesting Officer*           *Commissioner of Patents and Trademarks*